July 7, 1964 M. E. HARBOUR 3,140,217

MASKING TAPE APPLICATOR

Filed July 20, 1960 4 Sheets-Sheet 1

INVENTOR.
MARION E. HARBOUR
BY John J. McLaughlin
ATTORNEY

MASKING TAPE APPLICATOR

Filed July 20, 1960 4 Sheets-Sheet 2

INVENTOR.
MARION E. HARBOUR
BY [signature]
ATTORNEY

INVENTOR.
MARION E. HARBOUR
BY John J. McLaughlin
ATTORNEY

July 7, 1964 M. E. HARBOUR 3,140,217

MASKING TAPE APPLICATOR

Filed July 20, 1960 4 Sheets-Sheet 4

INVENTOR.
MARION E. HARBOUR
BY John J. McLaughlin
ATTORNEY

United States Patent Office 3,140,217
Patented July 7, 1964

3,140,217

MASKING TAPE APPLICATOR

Marion E. Harbour, 2934 Arroya Chico, Tucson, Ariz., assignor of eight percent to Jerry L. Molinari, thirteen and one-third percent to Glenn R. Harbour, and thirteen and one-third percent to F. Bryan Harbour, all of Tucson, Ariz., and thirteen and one-third percent to Richard F. Hopkins, New York, N.Y.

Filed July 20, 1960, Ser. No. 44,084
7 Claims. (Cl. 156—577)

My invention relates to an improved manually operable precision masking tape applicator and is a continuation in part of my prior co-pending application, Serial #860,905, filed December 21, 1959, now abandoned.

Pressure sensitive tape of the type used for temporary application to preserve or protect a surface or portion of such surface has come into very extensive use and is known as masking tape. Notwithstanding the fact that masking tape is distributed nationally by several relatively large companies, and notwithstanding the fact that it has come to be used in many ways such as for masking moulding during the spray painting of automobiles, to mask areas during electro-plating and the like operations and to mask sensitive areas during fabrication of equipment during its manufacture, masking tape has continued to be applied for the most part without the use of any type of special applicator equipment. Many types of dispensers are known but in general cannot be satisfactorily employed for tape application, and those which have some possible use in the application of tape are ineffective for one reason or another. In almost all masking operations the tape must be precisely positioned for most effective use, and usually it is in this area that unsatisfactory results are obtained with such few special applicators as have been made available. Moreover, while manual application is used almost exclusively in such operations as protecting portions of an object such as an automobile during spray painting, manual application of masking tape requires a highly skilled operator and its precision application and/or the labor involved in manual application of masking tape becomes a significant cost in many operations.

Accordingly, the principal object of the present invention is the provision of a precision masking tape applicator.

Another object is the provision of a manually operable masking tape applicator.

Still another object is the provision of a masking tape applicator which may be held in one hand and in which the tape may be applied uniformly and with precision to a selected surface.

A further object of the invention is the provision of a masking tape applicator having an applicator roller in which the position of the tape on the applicator roller remains unchanged regardless of the nature of the surface to which the tape is being applied.

A still further object is the provision of a masking tape applicator which may be operated by hand without a guide and in which the tape may be applied to any portion of an exposed surface.

Other specific objects and features of my invention will be apparent from the following detailed description taken with the accompanying drawings, wherein.

Figure 1:
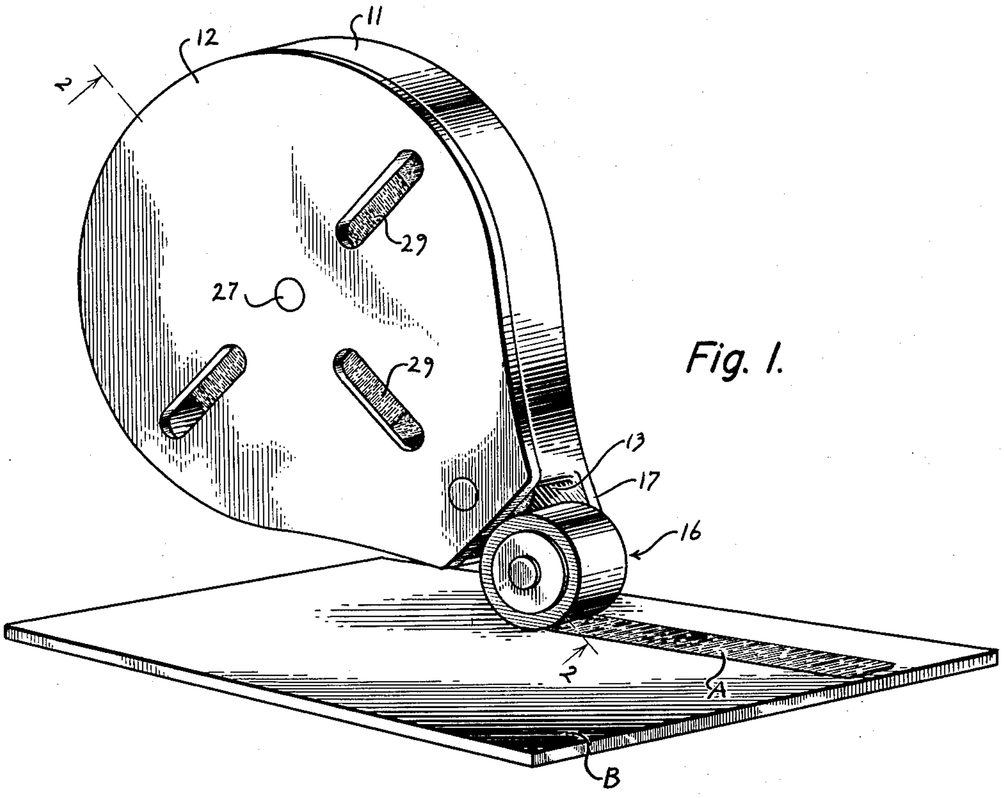
FIG. 1 is a full size perspective view showing one embodiment of my invention in a typical position for tape application to a flat surface.
Figure 3:
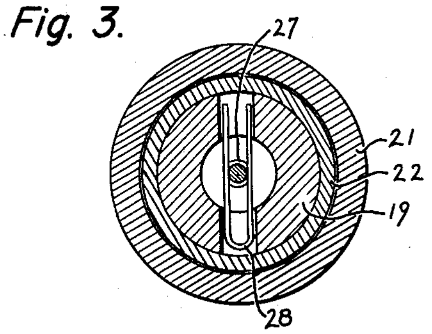
FIG. 3 is an enlarged transverse sectional view taken on the line 3—3 of FIG. 2 showing the manner in which the cover is releasably attached to the housing.

Referring now first to FIGS. 1 through 9 inclusive, the precision masking tape applicator of my present invention comprises a relatively shallow dish shaped housing 11 and snap cover 12, the resulting closed housing being adapted to hold a roll of masking tape and also functioning as a frame on which all of the moving parts of the applicator are supported. The housing while generally circular is bulged out at one edge to produce a general pear shape and at the location of the bulge an opening 13 is provided for passage of the tape over a stabilizer roller indicated generally by the reference character 14 and an applicator roller indicated generally by the reference character 16, the latter being mounted on a projecting portion 17 which extends beyond the covered portion of the housing.

The masking tape roll is carried on a spool indicated generally by the reference character 18 which spool includes an annular boss 19 on which a spool receiving ring 21 is rotatably mounted and which ring 21 is held in position by a keeper 22 having a press fit on an annular edge recess of the boss 19. The ring 21 is dimensioned to receive the usual hollow mandrel on which the masking tape is wound; and since the ring 21 is free to turn, the masking tape spool will always turn relatively easily as the tape is removed therefrom.

The stabilizer roller 14 comprises a boss 23 integral with the housing and an annular tape engaging member 24 relatively loosely held in position by a keeper 26 also in frictional engagement with an annular top recess on the boss 23. A top hub of the keeper 26 extends upwardly through a hole in the cover 12.

While the cover 12 may be retained in position in any suitable manner, I have obtained good results by a snap fastener arrangement in which a shouldered projection on a stud 27 snaps between a spreader 28 (FIG. 3) carried in a tubular recess of the boss 19. I may also provide radial openings 29 and 31 in the cover and housing respectively so that the operator can tell at a glance how much unused tape still remains on the spool.

Figure 2:
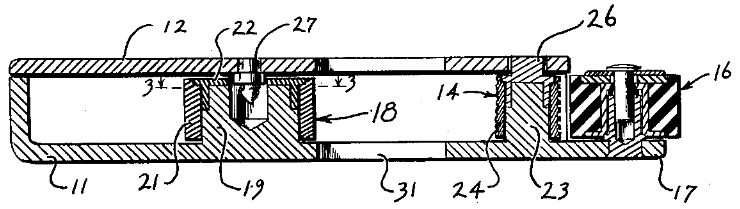
FIG. 2 is a longitudinal sectional view taken on the line 2—2 of FIG. 1.
Figures 4, 5, 6, 7:
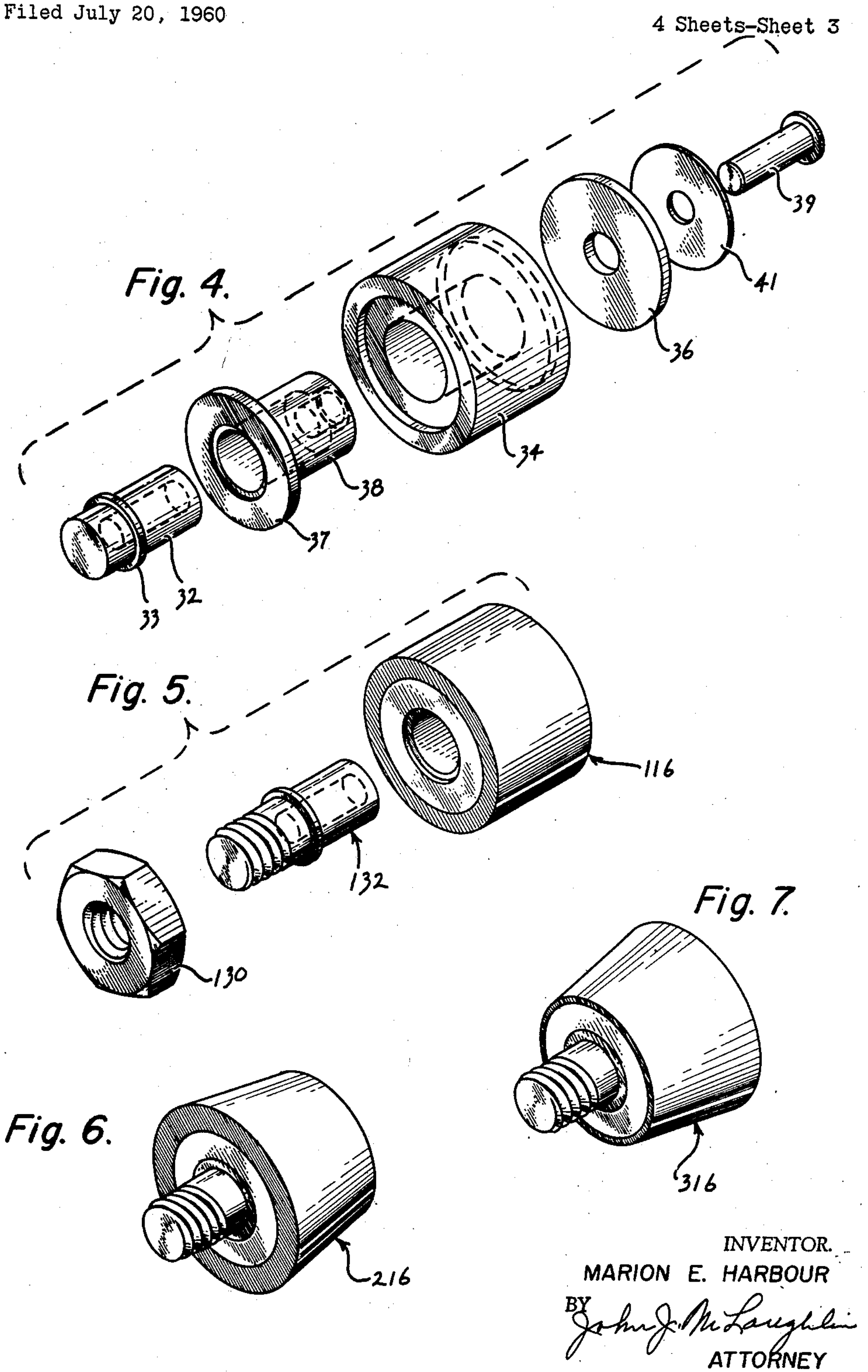
FIG. 4 is an exploded view showing the parts of the applicator roller in perspective.
FIG. 5 is an exploded view showing a modified mounting arrangement for the applicator roller.
FIGS. 6 and 7 are perspective views showing modified applicator rollers.

In FIGS. 2 and 4 I illustrate a form of applicator roller which I have found very satisfactory. This includes a hollow supporting stud 32 with an annular flange 33 which engages one surface of the projection 17, the bottom end of the supporting stud 32 being riveted or peened over to make a firm attachment. Preferably also the fit in the hole provided on the projection 17 is snug so that the supporting stud 32 will be precisely positioned with respect to the remaining portion of the applicator. The applicator roller also includes a generally cylindrical applicator member 34 formed of rubber or the like with annular recesses at its ends to receive a washer type flange member 36 and a flange 37 on a tubular support 38, the outer surface of the said support fitting snugly against the inside annular surface of the applicator member 34, and the inner surface of said core 38 fitting snugly against the outer annular surface of the supporting stud 32. A headed fastening pin 39 extends through a top retaining washer 41 and through the entire remaining portion of the assembly so that it is frictionally held in an annular tubular recess in the mounting stud 32. By means of the resulting frictional fit, very accurate positioning of the applicator roller results.

Figure 8:
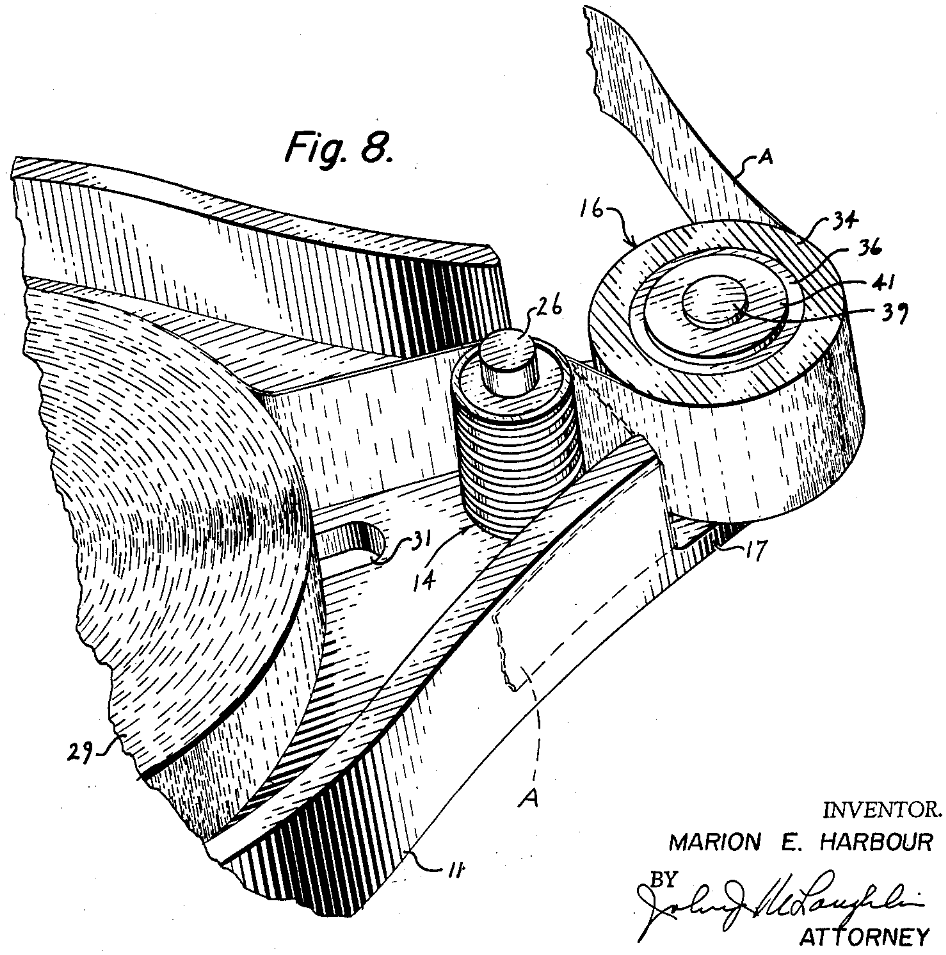
FIG. 8 is an enlarged fragmentary perspective view with the cover removed showing the manner in which the tape is fed over the stabilizer and applicator rollers.

The function of the stabilizer roller is to assure delivery of the tape to exactly the same position on the applicator roller at all times. In this connection it may be noted that if the tape used is one-half inch wide the applicator roller will also be exactly one-half inch wide. One function of the stabilizer roller, therefore, is to deliver the tape to the applicator as shown in FIG. 8 so that it exactly covers the outer surface of the applicator roller and does not project from either side thereof. To secure this result the stabilizer roller is preferably slightly tapered as both FIG. 2 and FIG. 8 show with the larger diameter portion at its base. This causes the tape always to be biased downwardly and this biasing action tends to hold all portions of the tape including the roll on the spool 18 at or near the bottom of the housing. The stabilizer roller is also slanted slightly toward the applicator roller. While both the taper and slanting of the stabilizer roller contribute to the function of exactly positioning the tape so that it runs truly at all times on the surface of the applicator roller, either feature can be used alone with some advantage. The combination tends not only to position the tape accurately but also to avoid any slight stretching of the tape along one edge, a problem which can be encountered with some tapes depending upon the manner of their manufacture. When the stabilizer roller is not tapered, normally at 1° to 2° forward slant is adequate; but the degree of slant and taper of the roller, when both are used, must be computed together.

Since the applicator of the present invention is relatively inexpensive it is advisable to provide an applicator for each type of operation. This not only saves time but permits the manufacturer to use a press fit for the production for assembly of the various movable parts with resulting accuracy and reduction of costs. I may, however, employ an applicator roller assembly 116 (FIG. 5) in which the mounting stud 132 is threaded and extends entirely through its supporting projection and is attached by means of a nut 130. For applying masking tape to special surfaces, such as a flat surface in a corner area, it is sometimes advisable to utilize applicator rollers of modified exterior configuration, such as tapered rollers 216 or 316 as shown in FIGS. 6 and 7 respectively. Such applicator rollers may be removable as indicated by the threaded shanks on their mounting studs, or they may be permanently attached in the same general manner as the applicator rollers shown in FIGS. 2 and 4.

Figure 9:
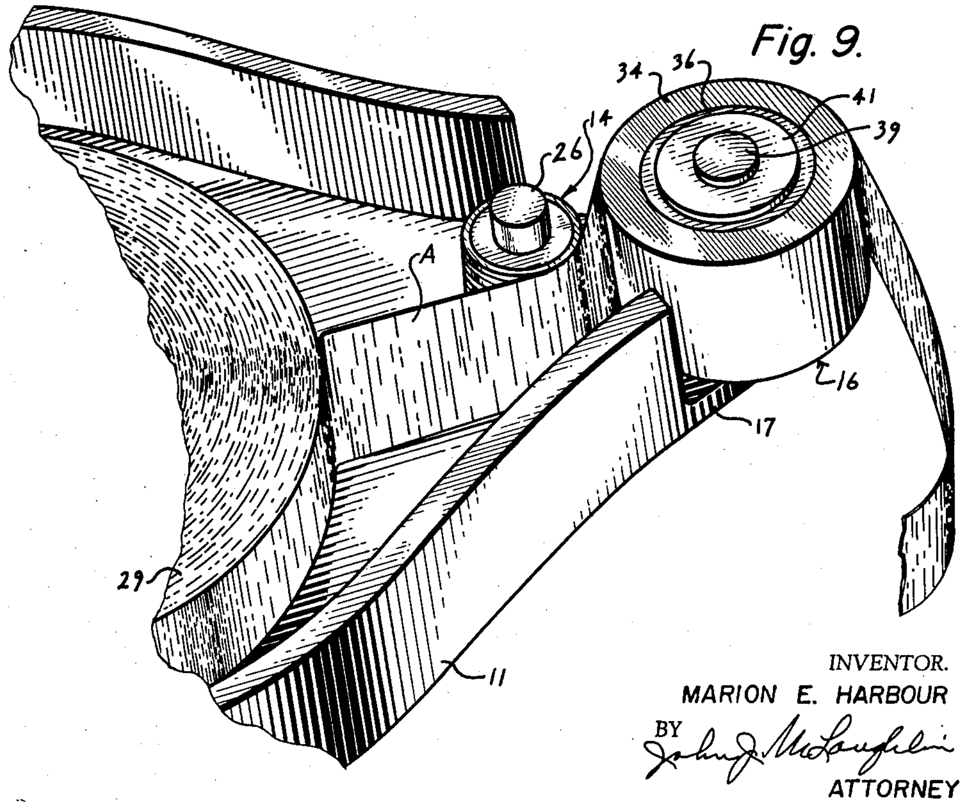
FIG. 9 is a view similar to FIG. 8 but showing the manner in which the tape may be fed in an opposite direction to the applicator roller.

As shown in FIG. 8, the masking tape is trained over the stabilizer roller 14 to the left thereof and then over the applicator roller to the right, the side of the tape bearing the adhesive, therefore, being in contact with the stabilizer roller and the uncoated side of the tape being in contact with the applicator roller. This is the normal positioning of the parts when the applicator is being utilized by a right-handed person who normally applies the tape from left to right. If a left-handed person is using the applicator, his normal approach is to apply the tape from right to left. To do so he turns the entire roll of tape over and threading the tape over the stabilizer roller with its coated side in contact therewith and then in the opposite direction over the applicator roller with its uncoated side in contact therewith. When the applicator roller is absolutely symmetrical as shown in FIGS. 8 and 9, it is possible merely to turn the entire unit over for a left-handed person to make use of it in accordance with his normal practice. Because the tape is biased downwardly, however, the better practice is to change the tape to the position shown in FIG. 9, a practice which is further essential if a tapered roller is used or if a guide is employed as shown in my co-pending application, Serial No. 860,905.

Figure 10:
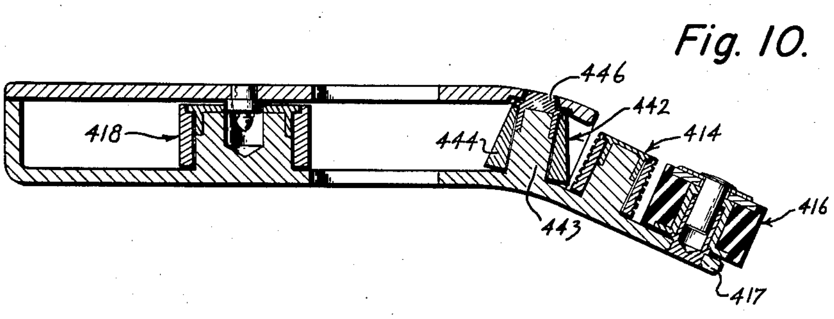
FIG. 10 is a longitudinal sectional view similar to FIG. 2 but showing modification.

In the modification shown in FIG. 10 the projection 417 is turned downwardly away from the plane occupied by the roll of tape and an additional tapered guide roller 442 employed. This guide roller includes a stud 443 which is integral with the frame comprising the housing, a tapered roller 444 rotatably carried on the stud and a keeper 446 in frictional engagement with the stud to retain the tapered roller 444 in position. The guide roller assembly 442 is preferably inclined forwardly, 12° from the vertical having been found satisfactory, and the stabilizer roller 414 inclined forwardly toward the applicator roller 416 an additional amount, for example another 12°, giving the assembly a total inclination of about 24° to the vertical as represented by the axis of the spool 418. The axes of the stabilizer roller 414 and the applicator roller 416 may be substantially parallel but preferably the same relationship and features described in connection with the main embodiment are employed with respect to the stabilizer and applicator rollers to assure delivery of the tape in a precision manner to the applicator roller. Remaining portions of this embodiment may be the same as described in connection with FIGS. 1 through 4; and to shorten the description I have applied the same reference characters thereto proceeded by the numeral 4 to indicate modification. In this modified form of the invention the guide roller 442 is in contact with the uncoated side of the tape and the stabilizer and applicator rollers in contact with the coated and uncoated sides of the tape respectively as in the first described embodiment.

When employing the applicator of the present invention a roll of tape A is mounted on the spool within the housing and then brought over the stabilizer roller and around the applicator roller in the manner shown in FIG. 8. When the instrument is not in actual use, the tape is brought around to the broken line position shown in FIG. 8 where it will adhere to the housing. When the tape is to be applied as to any surface B (FIG. 1), the applicator is held in the right hand while the operator removes the tape from the housing with his left hand and places it at the required starting position on the portion of the surface B to be masked. He then moves the applicator directly along the line where the tape is to be applied and the tape will always follow the exact position of the applicator roller even when the applicator itself is turned so as to apply the tape in an arch or curve to meet masking requirements. The position of the applicator with respect to the surface B is not critical, as the applicator may be inclined to the right, moved to a substantially vertical position and then inclined somewhat to the left with the sweep of the operator's arm and the applicator will function perfectly regardless of the changed position. Normally it is not even necessary to smooth the tape out with the free hand in any way, particularly when the tape is being applied along a straight line because the applicator roller applies uniform pressure over the entire surface of the tape to cause all of the coated surface to adhere in the required manner, even at the extreme edges. When a tapered roller is employed such as shown in FIGS. 6 and 7 to apply the tape uniformly to a surface immediately adjacent an abutment such as occurs for example in the corner of an ordinary room, the larger diameter edge of the roller is laid against the abutment and the applicator drawn straight down along the path where the tape is required. The tapered roller, of course, causes the housing portion of the applicator to sit at an angle to the abutment to thus facilitate application of the tape.

When employing the emodiment of FIG. 10, the roll of tape is set on the spool and the housing cover replaced as in the first described embodiment. The tape, however, is threaded around the rollers with the uncoated side in contact with the guide roller, the coated side in contact with the stabilizer roller and the uncoated side in contact with the applicator roller. As in the first described embodiment, the tape is positioned with exactitude on the periphery of the applicator roller. The form of the applicator shown in FIG. 10 has its greatest utility when masking is required close to an abutment setting at a relatively acute angle to the surface to be masked. This form of the invention, however, may also be employed for masking on obstructed surfaces by merely engaging the applicator roller squarely against such surfaces.

In using the applicator of the present invention it is preferable that the tape be matched to the applicator in such a way that the width of the tape and the width of the applicator roller are identical. It is possible, however, to employ a tape which is somewhat narrower than the applicator roller, in which case the tape will engage the applicator roller with its bottom edge at the bottom edge of the applicator roller. It should be noted also that regardless of the specific embodiment of the invention utilized, the tape can be supported on the applicator for convenient use by either a left-handed or right-handed person. In this connection it should be noted that preferably the applicator roller is entirely exterior of the housing, but in any case its outer peripheral surface should project beyond the projection on which it is mounted throughout a substantial portion of its periphery. This construction permits considerable latitude in the angle at which the applicator can be held with respect to the surface. Preferably also the axes of the stabilizer and applicator rollers are in alignment radially with the axis of the spool on which the roll of tape is carried. While the stabilizer roller may be somewhat offset with respect to such axis and good application of the tape obtained, there may be some loss in the ambidextrous aspects as indicated by comparison of FIGS. 8 and 9. Should the stabilizer roller be offset there should be a compensating modification in the inclination of its axis to assure its proper functioning to place the tape squarely between the side edges of the applicator roller.

The applicator of the present invention may be made from various materials and in accordance with various inexpensive fabrication procedures. Good results have been had producing the housing and frame portions of light weight alloy metal castings. Outer surfaces of the spool and applicator roller are preferably smooth, but the exterior surface of the stabilizer roller is preferably knurled or otherwise uniformly roughened. Parts requiring close tolerance and subjected to wear are preferably steel, and the surface of the applicator roller as formed by the applicator member thereof is preferably formed of live rubber. While the stabilizer roller is suitably within the housing, it should always be placed in a position at the peripheral opening in the housing to provide for free tape passage therethrough. As shown in FIG. 10, for example, the guide roller 442 is in the housing but the stabilizer roller is just outside of same, and aligned with the guide roller and applicator roller for free tape movement between the housing and the applicator roller. As in the applicator shown in FIGS. 8 and 9, the tape may be trained over the several rollers in the FIG. 10 embodiment to in either way accommodate either a left or right-handed person, or to facilitate application of the tape to an unusual surface condition.

The masking tape applicator of the present invention may be made of any suitable size to accommodate any usual masking tape roll sizes. Preferably, however, it is made of a suitable size to be held conveniently in one hand, with a housing having an inner diameter of three to four inches. With this size applicator, special sizes of tape rolls not offered as a standard before my invention have been used, and since a new roll of tape is quickly and easily insertable, the great speed and precision attainable in a masking operation is not appreciably affected. Also, I wish to note that while the device is primarily intended for the application of masking tape, any pressure sensitive type tape may be applied by its use.

I have shown and described in detail specific embodiments of my invention so that those skilled in the art will understand the manner of practicing the same, but the scope of the invention is defined by the claims.

I claim:

1. A precision applicator for the manual precision placement of masking tape, said applicator comprising a housing having a peripheral opening therein, a cover on said housing, means within the housing for supporting a roll of masking tape, a projection from the housing at said peripheral opening, a stabilizer roller at said opening, and an applicator roller carrier by the said projection exteriorly of the housing, said stabilizer roller being tapered with its larger diameter in the direction of the housing on which it is supported, and having its axis inclined slightly in the direction of the applicator roller, said stabilizer roller and applicator roller being aligned in radial relation with respect to the roll of masking tape.

2. A precision applicator for the manual precision placement of masking tape, said applicator comprising a housing having a peripheral opening therein, a cover on said housing, means within the housing for supporting a roll of masking tape, a radial projection from the housing at said peripheral opening, a stabilizer roller at said opening, and an applicator roller carried by the said projection exteriorly of the housing in radial alignment with said roll of masking tape, said stabilizer roller being tapered with its larger diameter in the direction of the housing on which it is supported, and having its axis inclined slightly in the direction of the applicator roller.

3. A precision applicator for the manual precision placement of masking tape, said applicator comprising a housing having a peripheral opening therein, a cover on said housing, means within the housing for supporting a roll of masking tape, a projection from the housing at said peripheral opening, a stabilizer roller at said opening, and an applicator roller carried by the said projection exteriorly of the housing, said stabilizer roller being inclined slightly in the direction of the applicator roller, said stabilizer roller and applicator roller being aligned in radial relation with respect to the roll of masking tape.

4. A precision applicator for the manual precision placement of masking tape, said applicator comprising a frame providing a housing and a projection from said housing, means within the housing for rotatably supporting a roll of masking tape, an applicator roller carried by the said projection with its periphery extending beyond the said projection, and a stabilizing roller aligned with the roll of masking tape and applicator roller, said stabilizing roller being slightly tapered and having its axis inclined slightly toward the applicator roller for biasing the masking tape toward one edge of the applicator roller to cause the said tape to assume a fixed definite position on the applicator roller.

5. A precision applicator for the manual precision placement of masking tape as defined in claim 4 wherein said projection is at an angle to the plane of the housing placing the axes of the applicator roller and stabilizer roller out of parallel with the axis of the masking tape roll, and including an upwardly tapered guide roller disposed substantially between said housing and projection so that its axis is at an obtuse angle to each, said guide roller having its taper from bottom to top to pitch the tape from the plane of its roll to the inclined plane of the applicator roller.

6. A precision applicator for the manual precision placement of masking tape, said applicator comprising a closed housing with a peripheral projection therefrom and a peripheral opening aligned with said projection, a spool in the housing for rotatably supporting a roll of masking tape, a stabilizer roller near said peripheral opening, and an applicator roller on said projection having the same width as the tape, said stabilizer roller being tapered and with its axis slightly inclined toward the applicator roller to bias said tape toward one edge of the applicator roller for uniformly positioning said tape on the applicator roller without overlapping the same at its edges.

7. A precision applicator for the manual precision placement of masking tape, said applicator comprising a housing having a peripheral opening and an axial projection at said opening offset at an angle from the plane of such housing, a spool in the housing for rotatably supporting a roll of masking tape, and an applicator roller carried on said projection, a guide roller, said guide roller, stabilizer roller and applicator roller being substantially aligned on a radius line from the spool running through said peripheral housing opening, said applicator roller being substantially perpendicular to said projection, said stabilizer roller being slightly tapered and having its axis inclined slightly toward the applicator roller to bias the masking tape toward one edge of the applicator roller, and said guide roller being tapered with its axis at an obtuse angle to both the tape roll axis and applicator roller axis to incline the tape sideways from the plane of the roll from which it is drawn into peripheral contact with the said stabilizing roller.

References Cited in the file of this patent

UNITED STATES PATENTS

| | | |
|---|---|---|
| 2,368,262 | Oftedahl et al. | Jan. 30, 1945 |
| 2,511,857 | Fritzinger | June 20, 1950 |
| 2,683,547 | Fischer | July 13, 1954 |
| 2,916,228 | Wellington | Dec. 8, 1959 |
| 2,918,189 | Frohbach et al. | Dec. 22, 1959 |